US008757547B2

(12) United States Patent
Porte et al.

(10) Patent No.: US 8,757,547 B2
(45) Date of Patent: Jun. 24, 2014

(54) AIRCRAFT NACELLE AIR INTAKE INCORPORATING OPTIMIZED ICE-TREATMENT HOT AIR INJECTION MEANS

(75) Inventors: Alain Porte, Colomiers (FR); Arnaud Hormiere, Toulouse (FR); Alain Dega, Montberon (FR)

(73) Assignee: Airbus Operations S.A.S., Toulouse (FR)

( * ) Notice: Subject to any disclaimer, the term of this patent is extended or adjusted under 35 U.S.C. 154(b) by 5 days.

(21) Appl. No.: 13/515,882

(22) PCT Filed: Dec. 14, 2010

(86) PCT No.: PCT/FR2010/052710
§ 371 (c)(1),
(2), (4) Date: Jun. 14, 2012

(87) PCT Pub. No.: WO2011/073565
PCT Pub. Date: Jun. 23, 2011

(65) Prior Publication Data
US 2012/0248250 A1 Oct. 4, 2012

(30) Foreign Application Priority Data
Dec. 18, 2009 (FR) ...................................... 09 59162

(51) Int. Cl.
*B64D 15/02* (2006.01)
(52) U.S. Cl.
USPC .................................................... 244/134 B
(58) Field of Classification Search
USPC ............. 244/134 R, 134 B, 207, 53 B, 200.1, 244/204.1
See application file for complete search history.

(56) References Cited

U.S. PATENT DOCUMENTS

| 3,933,327 | A | * | 1/1976 | Cook et al. | 244/134 B |
| 4,674,714 | A | * | 6/1987 | Cole et al. | 244/134 B |
| 4,688,745 | A | * | 8/1987 | Rosenthal | 244/134 R |
| 4,757,963 | A | * | 7/1988 | Cole | 244/134 B |
| H648 | H | * | 7/1989 | Tran | 244/134 B |
| 5,011,098 | A | * | 4/1991 | McLaren et al. | 244/134 B |
| 5,400,984 | A | * | 3/1995 | Arnold et al. | 244/134 B |
| 5,807,454 | A | * | 9/1998 | Kawabe et al. | 156/214 |

(Continued)

FOREIGN PATENT DOCUMENTS

| EP | 0376371 A2 | 7/1990 |
| FR | 2813581 A1 | 3/2002 |

OTHER PUBLICATIONS

International Search Report, dated Jun. 22, 2011, from corresponding PCT application No. PCT/FR2010/052710.

*Primary Examiner* — Tien Dinh
*Assistant Examiner* — Michael A Fabula
(74) *Attorney, Agent, or Firm* — Young & Thompson

(57) ABSTRACT

An aircraft nacelle air intake includes a duct extending around the circumference of the air intake and elements (24) for the localized injection of hot air into the duct to make the hot air circulate in the duct along its circumference, characterized in that the injection elements (24) include a collector tank in a plane secant with the direction of the stream of air flowing through the duct including at least one hole (44) allowing the air stream flowing in the duct to pass through it and a plurality of injection orifices (46) which are connected to a hot air supply and arranged around the passage hole or around and/or between the passage holes (44).

9 Claims, 4 Drawing Sheets

(56) References Cited

U.S. PATENT DOCUMENTS

| | | | |
|---|---|---|---|
| 5,841,079 A * | 11/1998 | Parente | 181/214 |
| 5,865,400 A * | 2/1999 | Pike et al. | 244/134 B |
| 5,873,544 A * | 2/1999 | Pike et al. | 244/1 A |
| RE36,215 E * | 6/1999 | Rosenthal | 244/134 B |
| 6,079,670 A * | 6/2000 | Porte | 244/134 B |
| 6,119,978 A * | 9/2000 | Kobayashi et al. | 244/35 R |
| 6,131,855 A * | 10/2000 | Porte | 244/134 B |
| 6,193,192 B1 * | 2/2001 | Porte | 244/134 B |
| 6,196,500 B1 * | 3/2001 | Al-Khalil et al. | 244/134 R |
| 6,267,328 B1 * | 7/2001 | Vest | 244/134 B |
| 6,354,538 B1 * | 3/2002 | Chilukuri | 244/134 B |
| 6,371,411 B1 * | 4/2002 | Breer et al. | 244/134 R |
| 6,427,434 B2 * | 8/2002 | Porte et al. | 60/39.093 |
| 6,443,395 B1 * | 9/2002 | Porte et al. | 244/134 B |
| 6,457,676 B1 * | 10/2002 | Breer et al. | 244/134 R |
| 6,467,730 B2 * | 10/2002 | Laugt | 244/134 B |
| 6,585,191 B2 * | 7/2003 | Andre et al. | 244/134 B |
| 6,592,078 B2 * | 7/2003 | Porte et al. | 244/134 B |
| 6,688,558 B2 * | 2/2004 | Breer et al. | 244/134 R |
| 6,698,691 B2 * | 3/2004 | Porte | 244/134 B |
| 6,702,233 B1 * | 3/2004 | DuPont | 244/134 B |
| 6,848,656 B2 * | 2/2005 | Linton | 244/134 C |
| 7,900,872 B2 * | 3/2011 | Sternberger | 244/134 C |
| 7,931,235 B2 * | 4/2011 | Zanarelli et al. | 244/134 B |
| 8,061,657 B2 * | 11/2011 | Rocklin et al. | 244/134 B |
| 2001/0023909 A1 * | 9/2001 | Laugt | 244/134 B |
| 2002/0027180 A1 * | 3/2002 | Porte et al. | 244/134 R |
| 2002/0047070 A1 * | 4/2002 | Breer et al. | 244/134 R |
| 2002/0139899 A1 * | 10/2002 | Porte | 244/134 B |
| 2002/0139900 A1 * | 10/2002 | Porte et al. | 244/134 C |
| 2002/0148929 A1 * | 10/2002 | Andre et al. | 244/134 R |
| 2002/0179773 A1 * | 12/2002 | Breer et al. | 244/134 R |
| 2008/0149771 A1 * | 6/2008 | Zanarelli et al. | 244/134 R |
| 2009/0090814 A1 * | 4/2009 | Barbara et al. | 244/134 B |
| 2009/0152401 A1 * | 6/2009 | Sternberger | 244/134 B |
| 2010/0163677 A1 * | 7/2010 | Rocklin et al. | 244/134 B |
| 2010/0200699 A1 * | 8/2010 | Porte | 244/134 B |
| 2011/0011981 A1 * | 1/2011 | Vauchel et al. | 244/134 B |
| 2011/0226903 A1 * | 9/2011 | Porte et al. | 244/134 B |
| 2012/0248249 A1 * | 10/2012 | Hormiere et al. | 244/134 B |

* cited by examiner

AIRCRAFT NACELLE AIR INTAKE INCORPORATING OPTIMIZED ICE-TREATMENT HOT AIR INJECTION MEANS

BACKGROUND OF THE INVENTION

1. Field of the Invention

This invention relates to an air intake of an aircraft nacelle that integrates optimized hot air injection means for frost treatment.

2. Description of the Related Art

In a known manner, as illustrated in FIG. 1, a propulsion system 10 of an aircraft 11, for example connected under the wing by means of a mast 12, comprises a nacelle 14 in which a power plant is arranged in an essentially concentric manner. The longitudinal axis of the nacelle is referenced 16.

The nacelle 14 comprises an inside wall that borders a pipe with an air intake 18 at the front that makes it possible to channel the air in the direction of the power plant.

This invention relates more particularly to a nacelle that integrates a frost treatment process that uses hot air in contact with the inside wall of the air intake 18, in particular hot air that is drawn off from the engine 19.

According to an embodiment that is known from the documents FR-2,813,581 and U.S. Pat. No. 6,443,395, illustrated in FIGS. 2 and 3A and 3B, a nacelle 14 comprises, on the inside, a partition that is called a front frame 20 that with the air intake 18 borders a pipe 22 that extends over the entire circumference of the nacelle and that has an essentially D-shaped cross-section in which the hot air circulates.

This pipe 22 is supplied with hot air by injection means 24.

The injected hot air makes a 360° passage around the pipe 22 before being discharged. In addition to a centrifugal action, the hot air circulates more on the outer side of the air intake referenced 28 in FIG. 2.

If the means 24 for injection of hot air are placed at the lowest point of the nacelle, the de-icing capacity is not homogeneous over the circumference. It quickly increases to reach a maximum value and then gradually decreases over the rest of the circumference, with an inconsistency of frost treatment at the lowest level.

Because of the centrifugal action and/or the non-homogeneous aspect of the temperature over the circumference, the temperature at the inner side 30 of the air intake cannot be adequate.

To remedy this possible inadequacy, it is possible to inject air that is hotter and/or with a higher flow rate.

However, this solution is not satisfactory because it is necessary to provide high-temperature-resistant materials for the front frame, the air intake and the optional acoustic treatment coverings. This aspect tends to reduce the selection of usable materials and generally imposes the use of heavy and relatively expensive materials.

As illustrated in FIGS. 3A and 3B, the injection means 24 can come in the form of a tube 32 that is perpendicular to the front frame that has one or more injection openings 34 that are oriented in the direction of circulation of the air that circulates in the pipe 22. In this case, the injection means generate, in the stream of less hot air that circulates in the pipe 22, a stream of just injected hot air whose boundary 36, indicated by dotted lines in FIGS. 3A and 3B, constitutes the exchange surface between these two air streams.

To improve the exchanges, a solution can consist in increasing the exchange surface by increasing the number of injection openings 34. However, in this case, the injection means are relatively bulky and produce significant pressure drops. In addition, increasing the number of injection openings while preserving an adequate injection rate in the pipe calls for increasing the necessary flow of hot air, which leads to increasing the necessary energy for its production and therefore the consumption of the aircraft.

According to another aspect, the greater the difference in temperatures between the injected hot air and the less hot air that circulates in the pipe, the less these two air streams are mixed although the stream of just injected hot air tends to impact the wall of the pipe with a very high temperature. Thus, two streams are obtained, one with a temperature that is significantly higher than the temperature that is necessary for frost treatment, and a second stream whose temperature is inadequate for said treatment.

To limit the impact temperature of the stream of just injected hot air, the documents FR-2,813,581 and U.S. Pat. No. 6,443,395 propose placing—behind the injection means 24—a mixer that comprises a nozzle-type tube that mixes the injected hot air with the less hot air that is already present and that circulates in the pipe 22. This solution has the advantage of reducing the maximum value of the temperature experienced by the wall of the pipe 22 and because of the mixing makes it possible to obtain a stream of hot air with an adequate temperature for frost treatment, having a flow rate that is significantly higher than that of the stream of just injected very hot air of the prior art without a mixer.

However, this mixer is not entirely satisfactory because it constitutes a supplementary part in addition to the injection means that induces a supplementary on-board weight and specific maintenance. However, if the injection means are accessible because of an access flap in the bottom part of the nacelle, the mixer is offset relative to said flap, although it is not easy to inspect it and it is often necessary to remove the air intake in case of malfunction, which calls for a substantial immobilization of the aircraft.

SUMMARY OF THE INVENTION

Also, the purpose of this invention is to remedy the drawbacks of the prior art by proposing an air intake of an aircraft nacelle that uses hot air for frost treatment, integrating optimized hot air injection means.

For this purpose, the invention has as its object an air intake of an aircraft nacelle that comprises a pipe that extends over the circumference of said air intake and means for localized injection of hot air in said pipe providing the circulation of the hot air in the pipe along its circumference, characterized in that the injection means comprise a collector tank in a plane that is secant to the direction of the air flow that circulates in the pipe that comprises at least one hole that makes it possible for the flow of air that circulates in the pipe to pass through it and a number of injection openings that are connected to a supply of hot air and arranged around the passage hole and/or between the passage holes.

BRIEF DESCRIPTION OF THE DRAWING FIGURES

Other characteristics and advantages will emerge from the following description of the invention, a description that is provided only by way of example, relative to the accompanying drawings, in which.

Figure 3A:
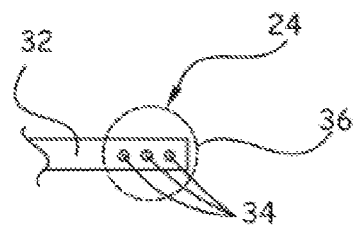
Figure 3B:
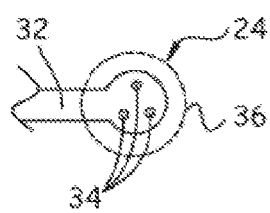
Figure 4:
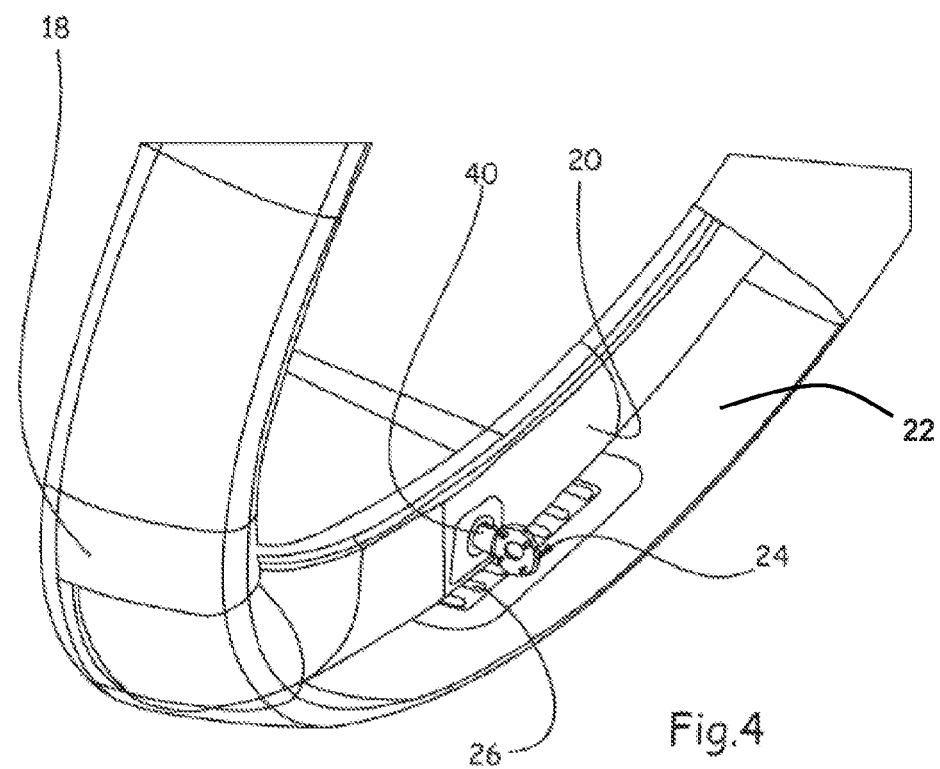
Figure 5:
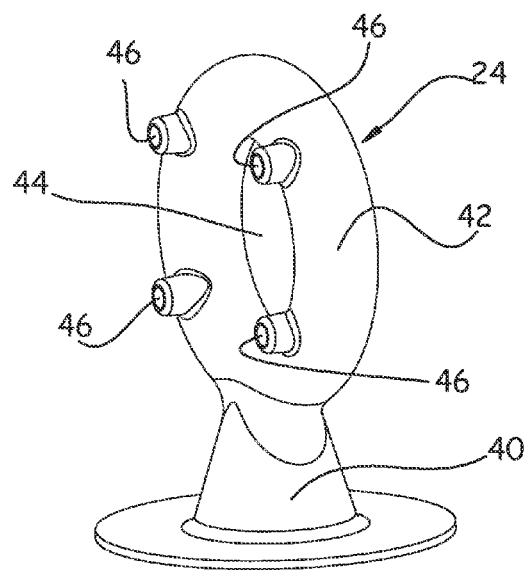
Figure 6:
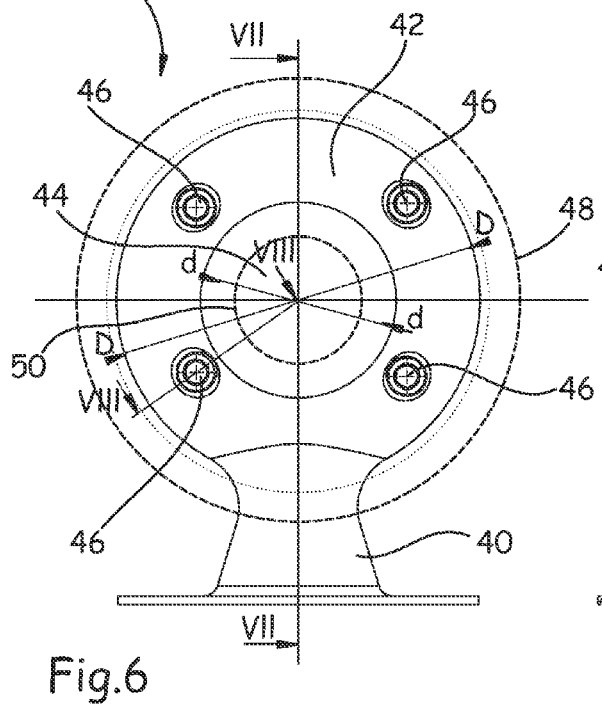
Figure 7:
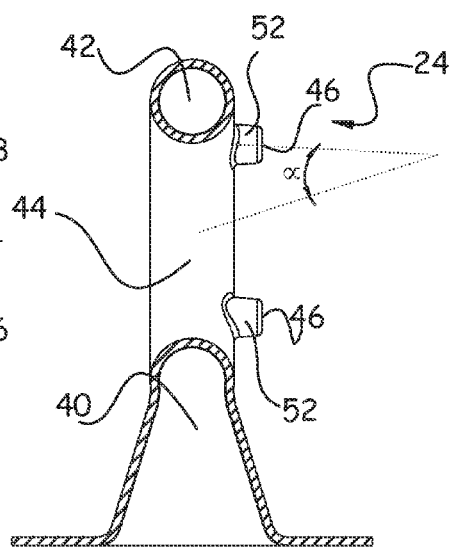
Figure 8:
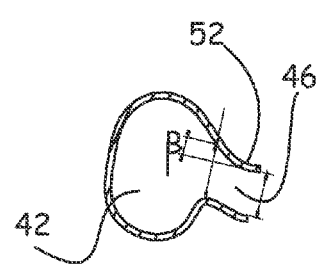
Figure 9:
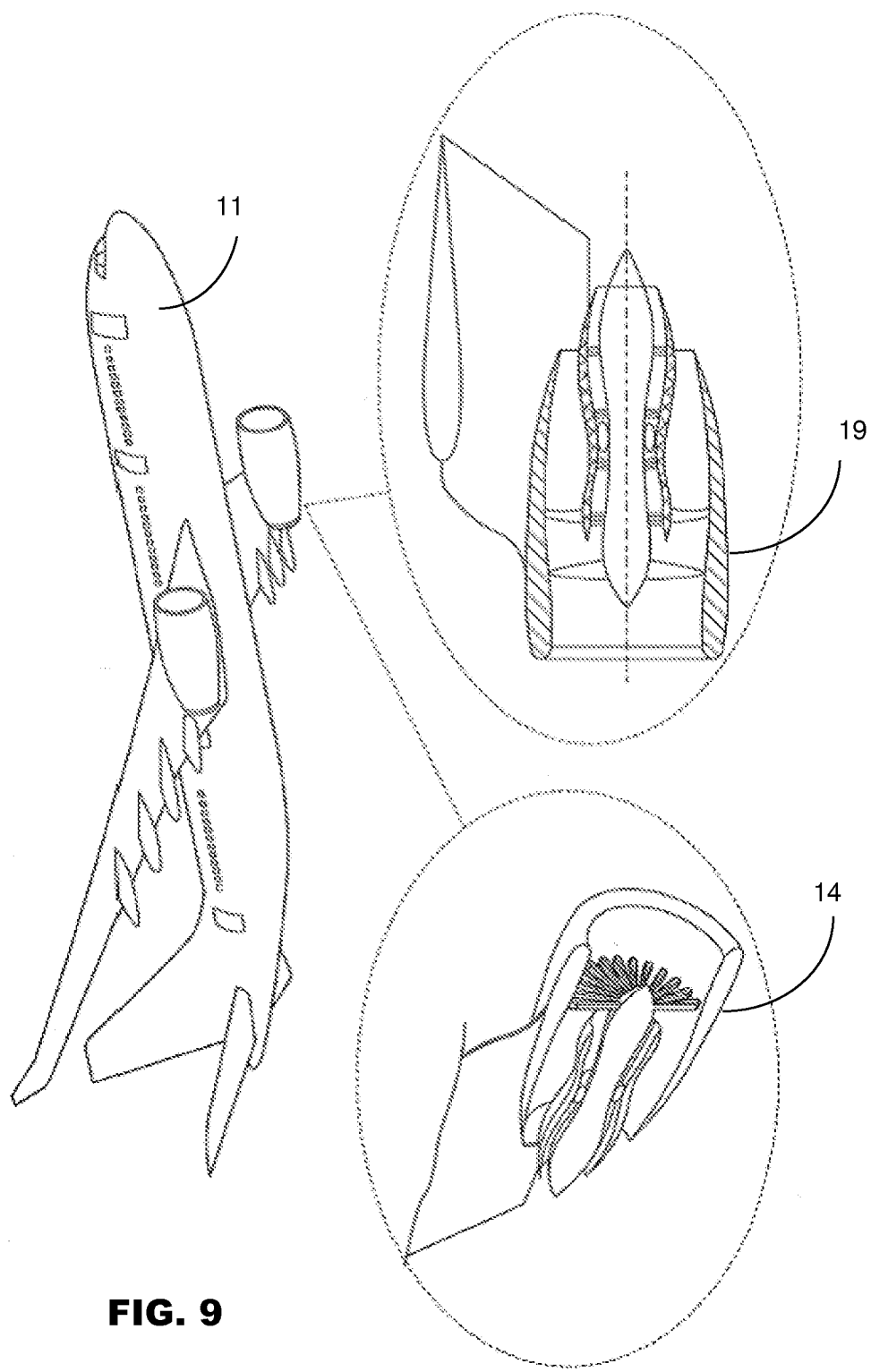

FIG. 3A is a side view that illustrates hot air injection means according to an embodiment of the prior art, FIG. 3B is a side view that illustrates hot air injection means according to another embodiment of the prior art, FIG. 4 is a perspective view that illustrates a part of an air intake that integrates hot air injection means according to the invention, FIG. 5 is a perspective view of the injection means according to the invention, FIG. 6 is a side view of the injection means according to the invention, FIG. 7 is a cutaway along line VII-VII of FIG. 6 of the hot air injection means according to the invention, FIG. 8 is a cutaway along line VIII-VIII of FIG. 6 that illustrates an injection opening of the hot air injection means according to the invention, and FIG. 9 shows an aircraft, an aircraft engine and an aircraft nacelle.

DETAILED DESCRIPTION OF THE INVENTION

Figure 1:
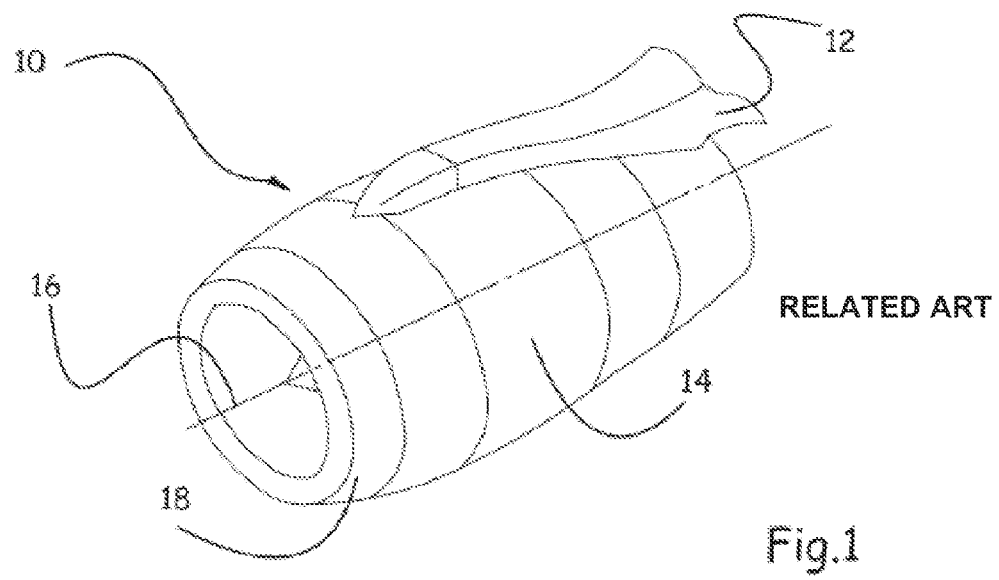
FIG. 1 is a perspective view of an aircraft nacelle.
Figure 2:
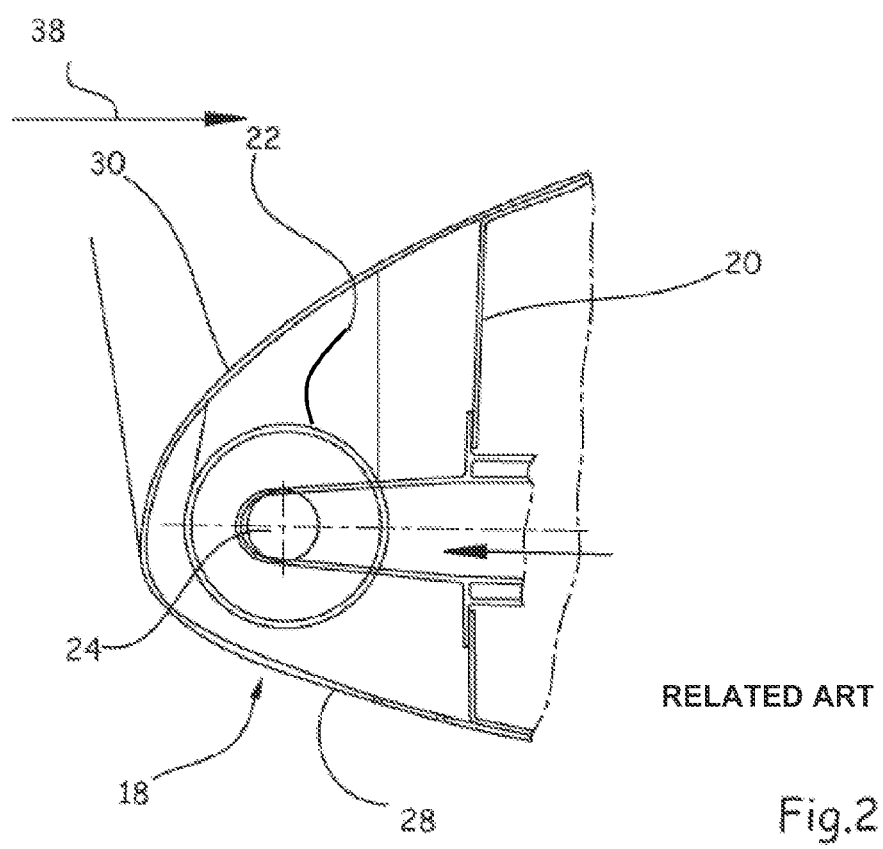
FIG. 2 is a cutaway along a longitudinal plane of the front of a nacelle.

FIG. 2 shows an air intake 18 of an aircraft nacelle. The air intake makes it possible to channel an air flow referenced by the arrow 38 to the power plant.

The front part of the air intake describes an essentially circular shape that extends in a plane that can be essentially perpendicular to the longitudinal axis, or not perpendicular, with the front part that is located just before 12 o'clock. However, other forms of air intake can be considered.

The invention relates more particularly to a nacelle that integrates a frost treatment that consists in using the hot air that is drawn off at the power plant.

According to one embodiment, a nacelle comprises a partition that is called a front frame 20 that with the air intake 18 borders a pipe 22 that extends over the entire circumference of the nacelle and that has a D-shaped cross-section.

According to one embodiment, this pipe 22 comprises means 24 for localized injection of hot air.

In addition, the pipe 22 comprises an exhaust 26 that can be seen in FIG. 4.

According to the illustrated example, the injection means 24 make it possible to generate a flow in the pipe 22 in the clockwise direction (as illustrated in the figures) or in the counterclockwise direction.

These injection means 24 can be arranged at the bottom part of the pipe.

The injection means 24 comprise a hot air intake tube 40 that projects relative to the front frame 20 and that is connected by any suitable means to the front frame 20 (for example, a collar), in the extension of an opening that is made in the front frame 20, with a supply of hot air emptying out at said opening to the rear of the front frame. As a variant, the tube 40 can pass through the front frame 20 and be connected to a hot air supply.

The hot air supply is not presented in more detail because it is known to one skilled in the art. The hot air is preferably drawn off at the power plant and directed to the air intake using one or more pipes.

According to the invention that is illustrated in more detail in FIGS. 5 to 8, the hot air injection means 24 comprise, on the one hand, an annular pipe 42 that is connected to the tube 40, arranged in a plane that is secant to the direction of the air that circulates in the pipe and that is placed in the pipe 22 in an essentially concentric manner, whereby said annular pipe defines a passage hole 44 for the air that circulates in the pipe, and, on the other hand, several injection openings 46 that are arranged at the periphery of the annular pipe 42 and able to inject hot air in a direction that approximately coincides with that of the air flow that circulates in the pipe 22.

According to an embodiment, the annular pipe 42 is arranged in an essentially radial plane.

Radial plane is defined as a plane that contains the longitudinal axis 16 and a radial direction.

According to this configuration, just after the injection of hot air, it is noted that the stream of just injected hot air is bordered by a first line 48 whose diameter is greater than or equal to the outside diameter D of the annular pipe 42 and by a second line 50 whose diameter is less than or equal to the inside diameter d of the annular pipe 42.

Thus, this configuration essentially makes it possible to increase the exchange surface between the stream of injected hot air and the stream of air that circulates in the pipe 22 without, however, increasing the space requirement of the injection means in the pipe and therefore pressure drops.

In a general manner, the injection means comprise a collector tank in a plane that is secant to the direction of the air flow that circulates in the pipe 22 that comprises a number of holes 44 that make it possible for the flow of air that circulates in the pipe to pass through it and a number of injection openings 46 that are connected to a supply of hot air and arranged around the passage hole or between the passage holes 44.

Thus, the passage holes 44 make it possible not to increase the pressure drops too much and to generate—between the streams of hot air injected through the injection openings 46—streams of less hot air that circulate already in the pipe, which makes it possible to increase the exchange surface between the just injected hot air and the hot air that already circulates in the pipe.

The variant that is presented in FIGS. 5 to 8 constitutes a simplified variant that comprises a passage hole that makes it possible to optimize the exchange surface and the pressure drops. In addition, this solution makes it possible to optimize the number of openings so as not to increase the consumption of the aircraft.

According to another characteristic of the invention, certain injection openings 46 are arranged in such a way as to inject the hot air in convergent directions as illustrated in FIG. 7.

According to a preferred embodiment, the annular pipe 42 comprises four injection openings 46, distributed uniformly over the periphery of the annular pipe, at 90°, each provided at the end with an injection pipe 52 with an essentially circular cross-section and with a length on the order of 20 mm.

The injection pipes 52 are oriented in such a way that the injected hot air flows are convergent to generate a perturbed and non-laminar flow that promotes the mixing between the injected hot air and the air that is already circulating in the pipe.

To optimize the mixing between the injected hot air and the air that already circulates in the pipe, the axes of the injection pipes 52 form an angle $\alpha$ of less than 20°, and preferably on the order of 10 to 15°, with the direction of the air flow that circulates in the pipe.

The injection pipes 52 can be oriented in such a way that the injected hot air flows form a flow that has a helical movement around the flow(s) that pass(es) through the passage holes 44.

So as to improve the mixing and to remedy the disruption of flows, each injection pipe 52 has a cross-section that diminishes up to the injection opening for increasing the injection rate of the hot air flow. Thus, the injection pipes 52 have a tapered shape that diminishes up to the injection opening 46 with an angle $\beta$ of less than 20° and preferably on the order of 5 to 10° as illustrated in FIG. 8.

To set an order of magnitude, the cross-section of the annular pipe is on the order of 400 mm², the outside diameter of the annular pipe is on the order of 120 mm, and the inside diameter is on the order of 65 mm, with the injection openings 46 having a diameter on the order of 13 mm.

The invention claimed is:

1. An air intake of an aircraft nacelle, comprising:
    an inlet lip connected to a front frame, thereby forming a channel, wherein the channel extends around a circumference of said inlet lip;
    at least one localized injector located within the channel and configured to provide circulation of hot air in the channel, the injector comprising:
        a toroidal pipe having a hollow interior;
        a tube connected to the toroidal pipe interior at one end, passing through or attached to the front frame, and configured to be connected to a hot air supply at an opposite end; and
        at least one injection opening arranged on the toroidal pipe;
    wherein the toroidal pipe surrounds/forms a boundary for at least one passage hole;
    wherein the hot air supply is configured to send heated air through the tube into the interior of the toroidal pipe, throughout the interior of the pipe, out of the at least one injection opening, and into the inlet channel;
    wherein the heated air exiting the at least one injection opening causes ambient air within the inlet channel to circulate in either a clockwise or counterclockwise direction;
    wherein the circulating air within the inlet channel passes over an outer circumference of the at least one toroidal pipe and through the at least one passage hole and mixes with the heated air exiting the at least one injection opening.

2. The air intake of an aircraft nacelle according to claim 1, wherein the at least one injection opening comprises a plurality of injection openings arranged to inject hot air in convergent directions.

3. The air intake of an aircraft nacelle according to claim 2, wherein the axes of the plurality of injection openings each form an angle ($\alpha$) of less than 20° with the direction of the air flow that circulates in the inlet channel.

4. The air intake of an aircraft nacelle according to claim 1, wherein the at least one injection opening comprises a plurality of injection openings arranged to inject hot air in convergent directions, and the plurality of injection openings are arranged in such a way that the injected hot air flows form a flow that has a helical movement around the flow(s) that pass through the at least one passage hole.

5. The air intake of an aircraft nacelle according to claim 1, wherein an injection nozzle is connected to each injection opening of the toroidal pipe, wherein the at least one nozzle has a cross-section that diminishes such that the injection velocity of the hot air flow increases.

6. The air intake of an aircraft nacelle according to claim 5, wherein the at least one injection nozzle has a tapered shape that diminishes by an angle ($\beta$) of less than 20°.

7. An aircraft nacelle that integrates an air intake according to claim 1.

8. An aircraft engine comprising an aircraft nacelle of claim 1.

9. An aircraft comprising the air intake of claim 1.

* * * * *